United States Patent [19]

Wiech, Jr.

[11] Patent Number: 4,717,340
[45] Date of Patent: Jan. 5, 1988

[54] DEBINDERIZER FOR RAPIDLY REMOVING BINDER FROM A GREEN BODY

[75] Inventor: Raymond E. Wiech, Jr., San Diego, Calif.

[73] Assignee: Fine Particle Technology Corp., Camarillo, Calif.

[21] Appl. No.: 870,415

[22] Filed: Jun. 4, 1986

[51] Int. Cl.⁴ .................................................. F27D 7/04
[52] U.S. Cl. ..................................... 432/199; 432/203; 432/205
[58] Field of Search ............... 432/205, 199, 203, 204; 126/21 A

[56] References Cited

U.S. PATENT DOCUMENTS

| | | | |
|---|---|---|---|
| 2,228,564 | 1/1941 | Guthrie | 432/199 X |
| 2,524,272 | 10/1950 | Sage | 126/21 A |
| 4,029,463 | 6/1977 | Johansson et al. | 126/21 A |
| 4,426,923 | 1/1984 | Ohata | 126/21 A |

Primary Examiner—Edward G. Favors
Attorney, Agent, or Firm—Jay M. Cantor

[57] ABSTRACT

The disclosure relates to a system for removing binder from "green" bodies wherein debinding action takes place substantially uniformly throughout the sytem for large load as well as for small loads. This result is obtained by providing a plurality of shelves for holding the parts and providing turbulent atmosphere flow across all shelves with recirculation taking palce over a water fall in the system to provide both a water saturated atmosphere and removal of binder from the atmosphere and system simultaneously.

18 Claims, 1 Drawing Figure

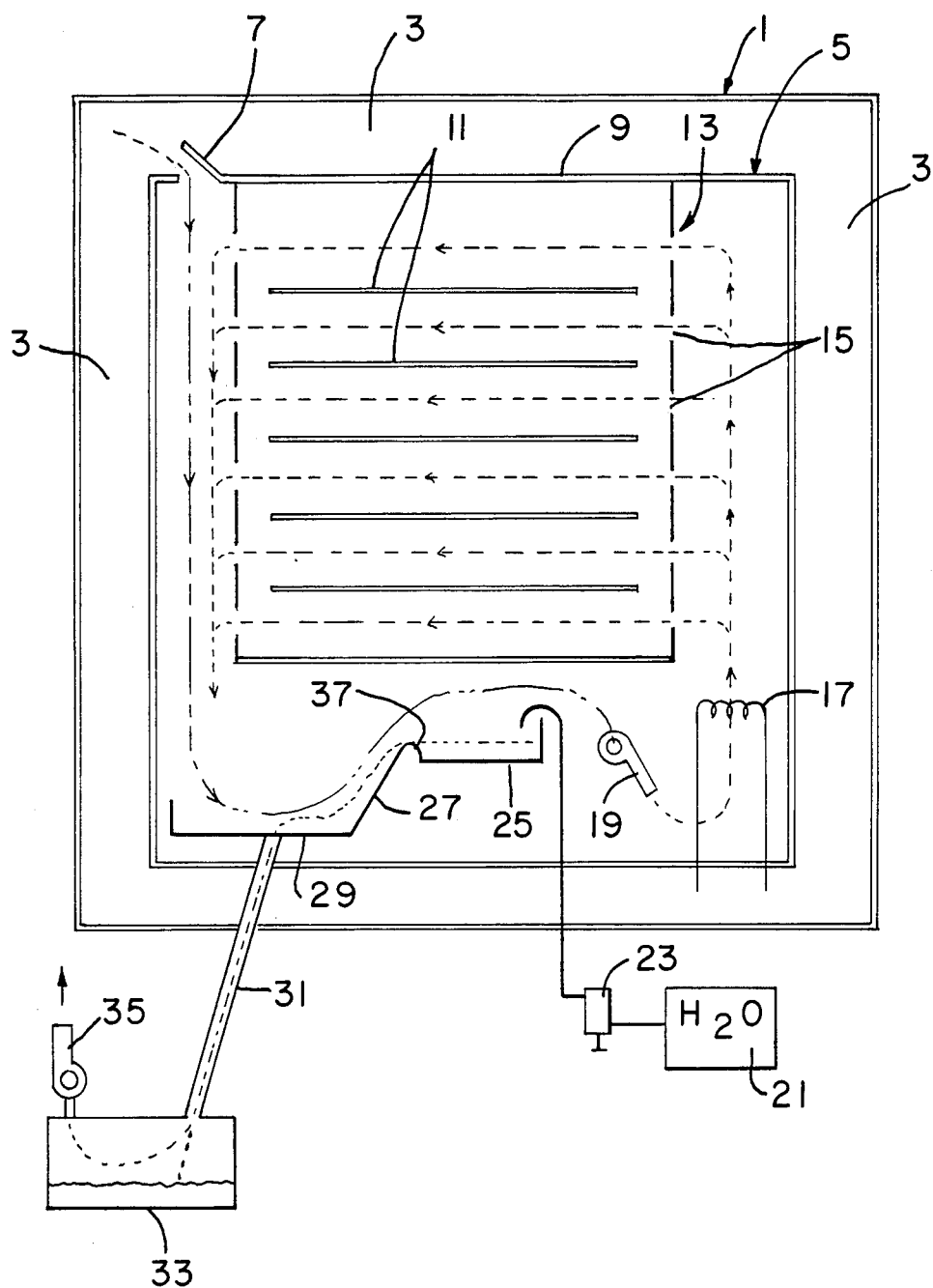

DEBINDERIZER FOR RAPIDLY REMOVING BINDER FROM A GREEN BODY

BACKGROUND OF THE INVENTION

1. Field of the Invention

This invention relates to a debinderizer for rapidly removing binder from a green body composed of fine particles of metal or ceramic and a binder system without causing swelling of the binder system while within the interstices of the green body and for removal of substantially all carbon formed during removal of the binder caused by pyrolysis and/or other reasons and to the method of providing a beneficial atmosphere stream path.

2. Description of the Prior Art

The art of forming articles from metal and ceramic particulate material is well known and examples of such systems are represented in the prior art patents of Strivens, U.S. Pat. Nos. 2,939,199, Curry 4,011,291, Wiech 4,404,166, the European application of Wiech (81100209.6, published July 22, 1981), Wiech U.S. Pat. No. 4,661,315 and others. In accordance with the procedures set forth in the disclosures in the above noted patents and European application, debinderizing and sintering have proceeded without any substantial problem with varying degrees of speed as long as the debinderizer load was small relative to the load capacity of the debinderizer. However, it was found that a carbon build-up developed both on the surface of as well as within the part being formed for large loads as stated in the above noted Wiech U.S. application. This problem was minimized to a great degree and debinderizing speed increased by the addition of water to the system as stated in said Wiech U.S application using prior art debinderizers. However, upon inspection, it was noted that sintered parts positioned within the debinderizer and remote from the direct path of recirculating atmosphere therein did not benefit from the carbon reduction and debinding speed to the same extent as the parts which were directly in the path of the moving atmosphere. This presented a yield problem which was undesirable. It is therefore apparent that a system and/or procedure which will improve the yield without adding offsetting problems is highly desirable.

BRIEF DESCRIPTION OF THE INVENTION

In accordance with the present invention, the above noted problem is minimized and there is provided a debinderizer and atmosphere flow path wherein binder is rapidly removed from "green" parts at substantially all locations within the debinderizer and wherein yields obtained per unit volume of debinderizer are much larger than those obtained in prior art debinderizers.

Briefly, in accordance with the present invention, there is provided a bebinderizer in the form of an oven having a plurality of shelves disposed one above the other to hold "green" parts. Openings are provided at opposite ends of each shelf to permit turbulent flow of the atmosphere along each shelf and over and around the "green" bodies sitting thereon at high speed. External atmosphere, such as air, as needed, enters the oven through a closable opening, mixes with recirculating atmosphere, and circulates over a water holding container and water fall to substantially saturate said atmosphere with water vapor. The saturated atmosphere is blown at high speed in a turbulent manner by a blower through a heater wherein the atmosphere is heated and then travels across the shelves in a direction parallel thereto to apply the saturated atmosphere in intimate contact with the green bodies, whereupon the atmosphere absorbs binder, leaves the shelf area, takes on external atmosphere as needed and recirculatres back over the water holding container and water fall system.

The water holding container and water fall system comprises an upper water holding tank into which water flows from an external source, the temperature of which is substantially below the boiling point of the components of the binder system and possibly some or all of the products of binder decomposition. The container has a lower side wall over which the water eventually falls and travels along an incline to a lower container, the recirculating atmosphere passing over both containers and the incline to vaporize most of said water. The water in the containers is sufficiently cool to cause the volatilized binder and some or all of the products of binder decomposition to condense therein and eventually fall to the bottom of the lower container. These condensed components pass, in the liquid or solid state, from the lower container to an enclosed container external of the oven along with some of the water and atmosphere under the influence of an external blower, the gases in the lower container being driven therefrom by a blower. The external blower creates a partial vacuum in the external container which pulls the liquified binder out of the oven along with some of the water and oven atmosphere. The oven is encased in a metal housing with Kaowool, a ceramic fiber insulator with high temperature capability to about 2300° F. being disposed between the housing and the oven to provide the insulation thereto.

The above described arrangement provides a recirculating water saturated atmosphere which moves at high speed and passes evenly and around substantially all "green bodies" in the oven to provide a unifrom and high degree of binder removal and a high degree of water reaction with any carbon formed by pyrolytic decomposition of the binder or otherwise in conjunction with all of the "green" bodies in the system.

BRIEF DESCRIPTION OF THE DRAWING

The drawing is a schematic showing a debinderizer in accordance with the present invention.

DESCRIPTION OF THE PREFERRED EMBODIMENT

Referring now to the Figure, there is a schematic showing of a debinderizer in accordance with the present invention. The debinderizer includes an outer steel housing 1, an oven 5 within the housing and insulation 3 between the housing and the oven. The insulation can be any material which is capable of withstanding temperatures which will be observed within the oven. A preferred insulating material is a proprietary product known as Kaowool which is a ceramic fiber insulator with a high temperature capability of up to about 2300° F. The oven 5 includes a closable opening 7 from the oven exterior thereinto through the oven outer surface 9, the latter being formed of steel sheet. The oven 5 and debinderizer and preferably in the shape of a rectangular parallelepiped though the shape is not critical. For example, a spherical or ovoid shape can also be used.

A plurality of stacked shelves 11 are positioned and secured within a shelf holder 13 having air passages 15 at opposite ends thereof to direct the travel of circulated atmosphere within the oven from one end of the shelf holder 13 to the other end thereof in a direction substantially parallel to the shelves 15, to thereby surround and remove binder from the "green" bodies disposed on the shelves. A heating element 17 is positioned within the oven 5, preferably in the path of atmosphere flow and just before the atmosphere stream enters the shelf holder 13. A blower 19 is positioned within the oven 5 and directs water saturated atmosphere toward the heating element 17 and also provides the atmosphere stream with the oven with an increased flow rate to provide a turbulent atmosphere stream when the stream passes over the "green" bodies on the shelves 11.

A water source 21 is provided external of the housing 1 to provide water through the valve 23 to an upper container 25 positioned within the oven 5 at the bottom thereof and directly in the atmosphere stream. The water will be sufficiently cool in order to cause condensation of binder and binder reaction products therein as is discussed hereinbelow.

The container 25 has a lowered side wall 37 at the upstream side thereof with an incline 27 extending from the wall 37 to a lower container 29, overflow water from container 25 passing over the incline 27 to the container 29. The lower container 29 and the incline 27 are also positioned directly in the path of atmosphere flow in order to saturate or at least humidify the atmosphere as it passes thereover. Since atmosphere contacting the water in container 25 or 29 or on the incline 27 will normally have volatilized binder or reaction products of the pyrolytic decomposition of the binder therein, such volatilized products, where appropriate, will condense in the water and gradually flow, either in the liquid or solid state, to the bottom of container 29.

A passageway 31 is provided at the base of the container 29 which empties into enclosed container 33 to pass liquid and solid binder and reaction products thereof from the bottom of container 29 to container 33. In addition, some atmosphere from oven 5 and water may pass along passageway 31 to container 33. A blower 35 communicates with the interior of container 33 to provide a partial vacuum therein, thereby causing the materials noted above which flow in passageway 31 to be pulled into container 33. The container 33 will thereby be a collection point for spent binder and any non-gaseous reaction products of binder decomposition. Any volatiles that enter container 33 via passageway 31 will be exhausted to the external atmosphere through or under the influence of blower 35. The bulk of any effluent particulates are retained in the water in container 33.

In actual operation, "green" bodies of the type disclosed in the prior art, as noted hereinabove and elsewhere, are placed on the shelves 11, the heater 17 is operated according to a predetermined temperature profile and the blower 19 is operated to cause an atmosphere stream to pass from the blower, over the heater and then along the shelves 11 in a turbulent and high speed flow around the "green" bodies to remove any liquid binder on the surface thereof as well as products of binder decomposition. The atmosphere then travels out of the shelf area and past the air inlet 7, where it takes on air in an amount sufficient to compensate for any loss of air at passageway 31. The atmosphere stream then passes over the water in container 29, the incline 27 and the container 25 to pick up moisture and to permit any volatiles which condense at the temperature of the water to condense into the water at one of the water locations. The moisturized air will continue along the somewhat circular, continuous path and will gradually become more saturated with each pass of the water up to substantially the saturation point. The condensed volatiles as well as particulates, water and air will also pass to container 33 via passageway 31 to remove binder and binder reaction products from the oven 5 on-line. As stated above, any particulates are retained in the water in container 33.

If desired, in the event an atmosphere other than air is required in the oven 5, the opening 7 can be closed and replaced with an input system of an appropriate atmosphere. For example, if an inert atmosphere is desired, an external tank of argon with a valve can be provided in place of the air input 7. In the case where a reducing atmosphere is required, the argon tank and valve can be supplemented with a hydrogen tank and valve.

It can be seen that there has been provided a debinderising system and method wherein the atmosphere is forced at high speed and with turbulent flow over the surfaces of "green" bodies with all of the "green" bodies having substantially equal access to the atmosphere stream, thereby providing uniformity and a high final yield of parts relative to prior art systems.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modification.

I claim:
1. A debinderizing system which comprises:
   (a) a housing,
   (b) a continuous defined atmosphere path within said housing having an atmosphere therealong,
   (c) means in said atmosphere path for applying water to said atmosphere,
   (d) heating means for heating said atmosphere,
   (e) sample holding means in said atmosphere path for holding samples, and
   (f) means for causing said atmosphere to move along said atmosphere path at sufficient velocity to provide turbulent flow along the surface of samples at said sample holding means.
2. The system of claim 1 wherein said holding means comprises means for directing passage of said atmosphere therethrough along defined subpaths.
3. The system of claim 2 wherein said holding means comprises plural stacked parallel shelves and means to direct said atmosphere across each of said shelves in the same direction.
4. A debinderizing system which comprises:
   (a) a housing,
   (b) a continuous defined atmosphere path with said housing having an atmosphere therealong,
   (c) means in said atmosphere path for applying water to said atmosphere,
   (d) heating means for heating said atmosphere,
   (e) holding means in said atmosphere path, and
   (f) means for causing said atmosphere to move along said atmosphere path at sufficient velocity to provide turbulent flow at said holding means,
   (g) wherein said means for applying water to said atmosphere comprises a first water holding container, a second water holding container upstream of and disposed below said first water holding container, an incline between said first and second containers, open to said atmosphere path, for pass- ing overflow water from said first container to said second container and means to supply water to said first container.

5. The system of claim 4 wherein said holding means comprises means for directing passage of said atmosphere therethrough along defined subpaths.

6. The system of claim 4 wherein said holding means comprises plural stacked parallel shelves and means to direct said atmosphere across each of said shelves in the same direction.

7. The system of claim 4 further including means coupled to said means for applying water to said atmosphere for removing condensed materials in said means for applying water to a location external of said housing.

8. The system of claim 5 further including means coupled to said means for applying water to said atmosphere for removing condensed materials in said means for applying water to a location external of said housing.

9. The system of claim 6 further including means coupled to said means for applying water to said atmosphere for removing condensed materials in said means for applying water to a location external of said housing.

10. The system of claim 7 wherein said means coupled includes a third container external of said housing, a passageway between said third container and said means for applying water and means for applying a partial vacuum along said passageway from said third container to remove said condensed materials along said passageway from said means for applying water to said third container.

11. The system of claim 8 wherein said means coupled includes a third container external of said housing, a passageway between said third container and said means for applying water and means for applying a partial vacuum along said passageway from said third container to remove said condensed materials along said passageway from said means for applying water to said third container.

12. The system of claim 9 wherein said means coupled includes a third container external of said housing, a passageway between said third container and said means for applying water and means for applying a partial vacuum along said passageway from said third container to remove said condensed materials along said passageway from said means for applying water to said third container.

13. A debinderizing system which comprises:
 (a) a housing,
 (b) a continuous defined atmosphere path within said housing having an atmosphere therealong,
 (c) means in said atmosphere path for applying water to said atmosphere,
 (d) heating means for heating said atmosphere,
 (e) holding means in said atmosphere path, and
 (f) means for causing said atmosphere to move along said atmosphere path at sufficient velocity to provide turbulent flow at said holding means,
 (g) further including means coupled to said means for applying water to said atmosphere for removing condensed materials in said means for applying water to a location external of said housing.

14. The system of claim 13 wherein said means coupled includes a third container external of said housing, a passageway between said third container and said means for applying water and means for applying a partial vacuum along said passageway from said third container to remove said condensed materials along said passageway from said means for applying water to said third container.

15. The system of claim 13 wherein said holding means comprises means for directing passage of said atmosphere therethrough along defined subpaths.

16. The system of claim 13 wherein said holding means comprises plural stacked parallel shelves and means to direct said atmosphere across each of said shelves in the same direction.

17. The system of claim 15 wherein said means coupled includes a third container external of said housing, a passageway between said third container and said means for applying water and means for applying a partial vacuum along said passageway from said third container to remove said condensed materials along said passageway from said means for applying water to said third container.

18. The system of claim 16 wherein said means coupled includes a third container external of said housing, a passageway between said third container and said means for applying water and means for applying a partial vacuum along said passageway from said third container to remove said condensed materials along said passageway from said means for applying water to said third container.

* * * * *